United States Patent
Liu et al.

(10) Patent No.: US 11,401,741 B2
(45) Date of Patent: Aug. 2, 2022

(54) INTERLOCKING LATCH STRIKER DESIGN

(71) Applicant: Ford Global Technologies, LLC, Dearborn, MI (US)

(72) Inventors: Frank Qiukui Liu, Canton, MI (US); Vijaykumar Hegde, Canton, MI (US); Thomas Junior Luckett, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 742 days.

(21) Appl. No.: 16/419,151

(22) Filed: May 22, 2019

(65) Prior Publication Data

US 2020/0370345 A1 Nov. 26, 2020

(51) Int. Cl.
| | |
|---|---|
| *E05B 85/04* | (2014.01) |
| *B60R 7/06* | (2006.01) |
| *E05B 79/02* | (2014.01) |
| *E05B 83/30* | (2014.01) |

(52) U.S. Cl.
CPC ............... *E05B 85/04* (2013.01); *B60R 7/06* (2013.01); *E05B 79/02* (2013.01); *E05B 83/30* (2013.01)

(58) Field of Classification Search
CPC .......... E05B 85/04; E05B 79/02; E05B 83/30; B60R 7/06
USPC .......................................................... 49/503
See application file for complete search history.

(56) References Cited

U.S. PATENT DOCUMENTS

| | | | | |
|---|---|---|---|---|
| 3,080,633 A | * | 3/1963 | Reddy | F16B 21/078 24/DIG. 54 |
| 4,796,930 A | * | 1/1989 | Baynes | E05B 63/244 292/DIG. 60 |
| 5,253,907 A | * | 10/1993 | Schnoor | E05B 47/0603 292/DIG. 60 |
| 7,469,945 B2 | * | 12/2008 | Dennis | E05B 85/045 292/341.18 |
| 8,403,374 B2 | | 3/2013 | Shimizu et al. | |
| 8,740,262 B2 | | 6/2014 | Buchheit | |
| 10,183,626 B2 | | 1/2019 | Thomas | |
| 2005/0183940 A1 | * | 8/2005 | Ichimaru | E05F 1/1066 200/523 |
| 2009/0230699 A1 | * | 9/2009 | Carabalona | B60R 7/06 292/48 |
| 2011/0025074 A1 | | 2/2011 | Reznar | |

FOREIGN PATENT DOCUMENTS

| | | |
|---|---|---|
| CN | 203729723 U | 7/2014 |
| JP | 2003184401 A | 7/2003 |

* cited by examiner

*Primary Examiner* — Pinel E Romain
(74) *Attorney, Agent, or Firm* — Vichit Chea; Price Heneveld LLP (57) ABSTRACT

A glove box assembly includes a surround structure having a central opening and a striker opening in the surround structure. The surround structure includes an interlock structure that is spaced inwardly from the striker opening and aligned with the striker opening. A striker is mounted in the striker opening of the surround structure adjacent the central opening. The striker includes an interlocking extension engaging the interlock structure. A glove compartment door is received in the central opening of the surround structure. The glove compartment door includes at least one latch pawl that is configured to releasably engage the striker.

20 Claims, 9 Drawing Sheets

INTERLOCKING LATCH STRIKER DESIGN

FIELD OF THE INVENTION

The present invention generally relates to glove boxes for vehicles, and in particular to a striker that assembles to a surround or frame of the glove box.

BACKGROUND OF THE INVENTION

Glove boxes for motor vehicles may include a surround or frame that is attached to a vehicle dashboard structure and a door that moves relative to the surround. The door may be retained in a closed position by latch pawls that engage one or more latch strikers mounted to the surround.

SUMMARY OF THE INVENTION

One aspect of the present disclosure is a glove box assembly including a surround or frame structure having a central opening and a striker opening in an upright sidewall of the surround structure. The surround structure may include a first interlock structure that is spaced inwardly from the striker opening and aligned with the striker opening. A striker is mounted in the striker opening of the surround structure adjacent the central opening. The striker includes a flange engaging the upright sidewall adjacent to the striker opening, and at least one barbed connector engaging the surround adjacent the striker opening to retain the striker to the surround. The striker includes an interlocking projection extending inwardly and engaging the first interlock structure such that the extension substantially prevents rotation of the striker in response to outward forces caused by the latch pawl acting on the striker. A glove compartment door is movably disposed in the central opening of the surround structure. The glove compartment door includes at least one latch pawl that is configured to releasably engage the striker to retain the glove compartment door in the closed position.

Embodiments of the disclosure can include any one or a combination of the following features:

The first interlock structure may, optionally, comprise an interlock opening;
The interlocking projection may, optionally, be received in the interlock opening;
The interlock opening may, optionally, be formed by a web, wherein the web has a transverse pocket on an inner surface of the web facing the interlock opening;
The interlocking projection may, optionally, include a barbed connector engaging the transverse pocket;
The web may optionally include first and second pockets facing the interlock opening, and the interlocking projection may, optionally, include first and second barbed connectors engaging the first and second pockets, respectively;
The first and second pockets may, optionally, comprise openings through the web.

Another aspect of the present disclosure is a glove box assembly including a surround structure having a central opening and a striker opening in a sidewall of the surround structure. The surround structure further includes an interlock opening that is spaced inwardly from the striker opening and aligned with the striker opening. The glove box assembly further includes a striker mounted in the striker opening of the surround structure adjacent the central opening. A glove compartment door is movably disposed in the central opening, and includes at least one latch pawl that is configured to releasably engage the striker to retain the glove compartment door in a closed position. The striker includes an interlocking projection that is received in the interlock opening.

Another aspect of the present disclosure is a method of assembling a striker to a surround of a glove box assembly. The method includes providing a surround structure having a central opening and a striker opening in a sidewall of the surround structure. The surround structure further includes an interlock structure that is spaced inwardly from the striker opening. The method further includes providing a striker having a pawl-engaging portion and an interlocking projection. The method includes positioning at least a portion of the striker in the striker opening, and causing the interlocking projection of the striker to engage the interlock structure by shifting the striker into an engaged position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
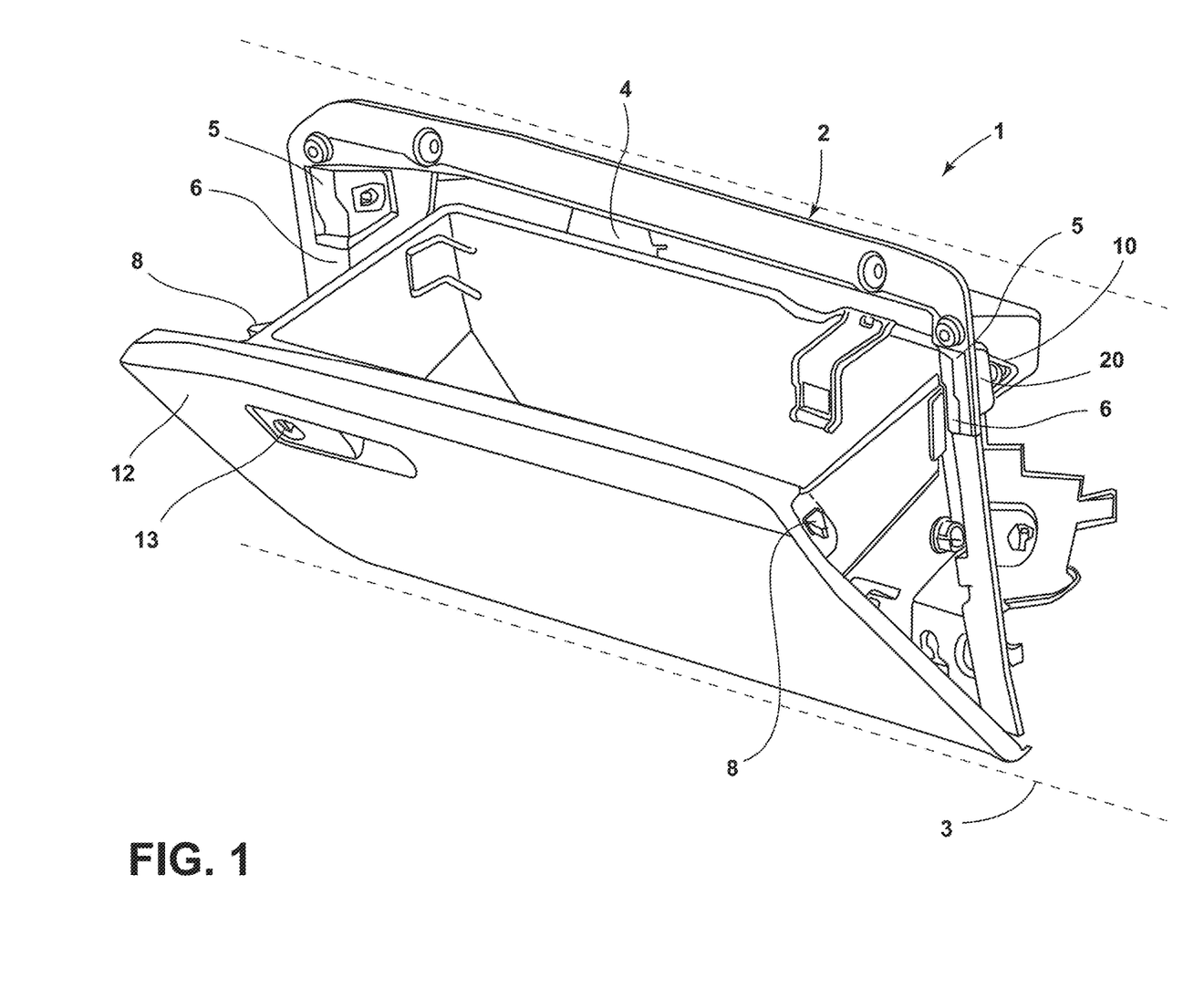
FIG. 1 is an isometric view of a glove box and surround according to one aspect of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
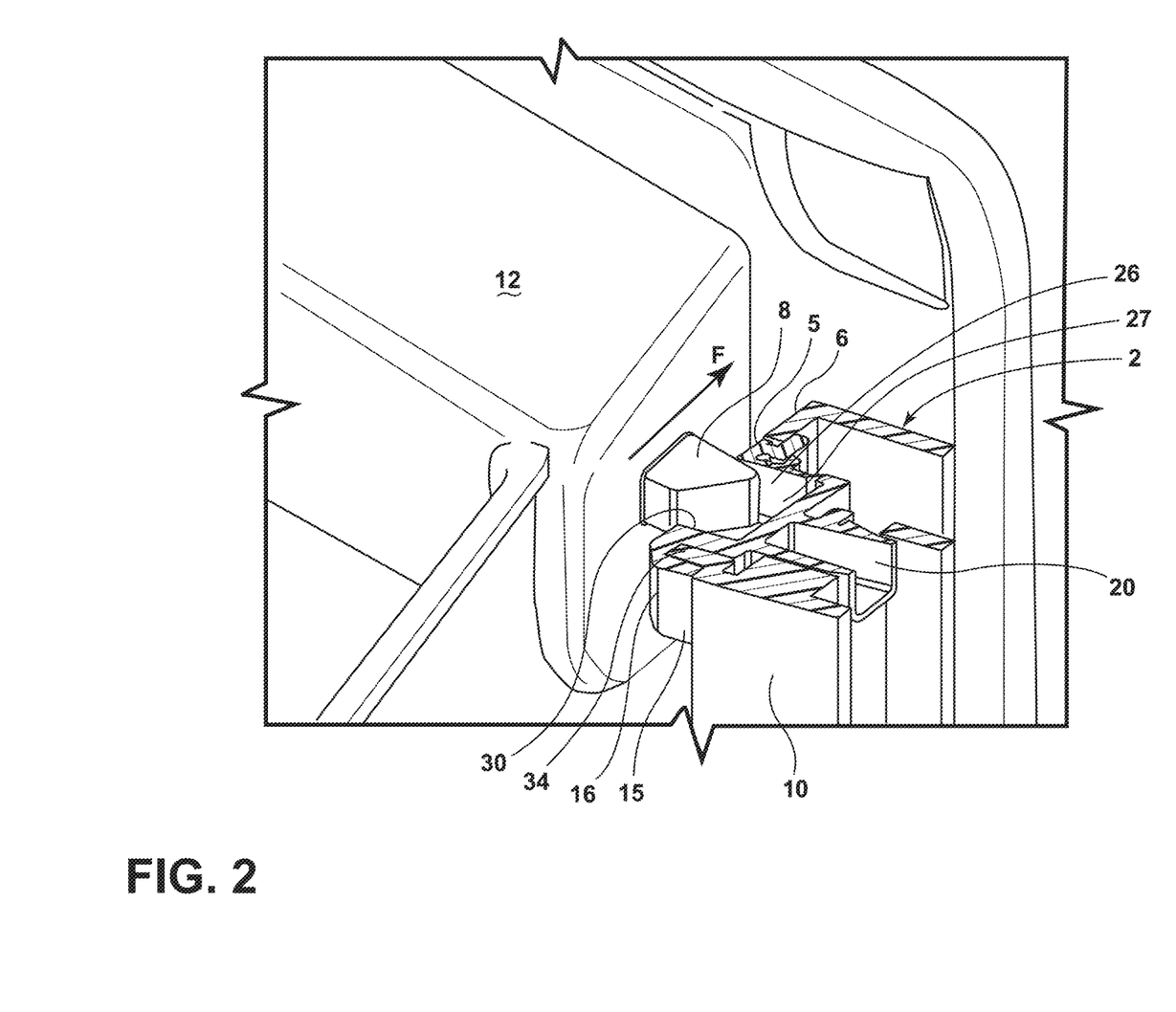
FIG. 2 is a partially fragmentary isometric cross-sectional view showing a latch pawl engaging a striker, wherein the striker is secured to the surround.

With reference to FIGS. 1 and 2, a glove box assembly 1 according to one aspect of the present disclosure includes a surround or frame 2 that is configured to be secured to a vehicle dashboard structure 3 utilizing mechanical fasteners or other known connecting features or devices. The surround structure 2 includes a central opening 4 and one or more striker openings 5 in upright sidewalls 6 of the surround structure 2 (see also FIG. 14) that receive strikers 15. A glove compartment door 12 is movably disposed in the central opening 4 of the surround structure 2. Door 12 includes latch pawls 8 that engage strikers 15. The surround structure 2 further includes a first interlock structure 10 that is spaced inwardly from the striker opening 5 (see e.g. FIG. 7), and aligned with the striker opening 5. Striker openings 5 may be mirror images of one another. Strikers 15 (FIG. 6) are mounted in the striker openings 5 (see also FIG. 7).

Figure 3:
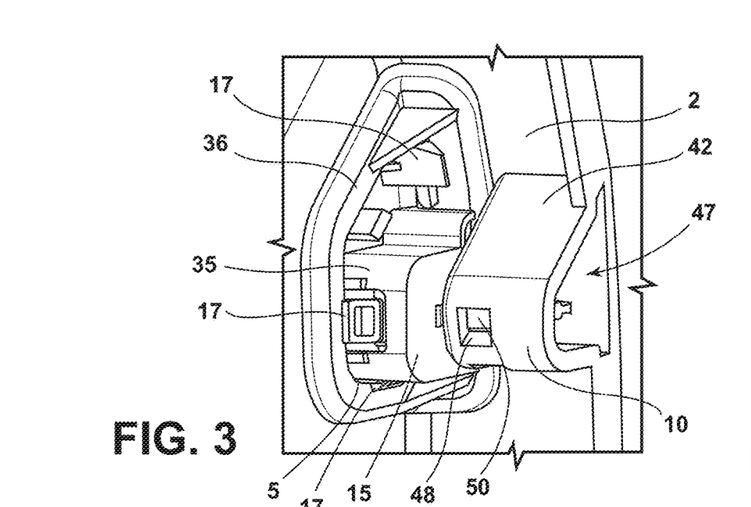
FIG. 3 is a fragmentary isometric view showing the striker assembled to the surround.
Figure 4:
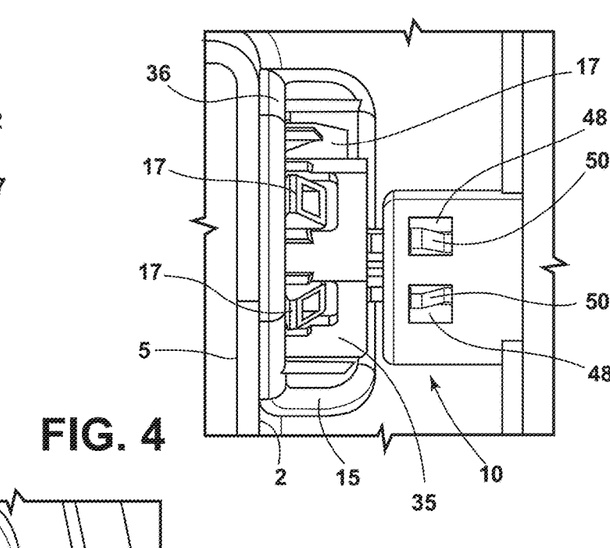
FIG. 4 is a fragmentary isometric view showing the striker assembled to the surround.
Figure 5:
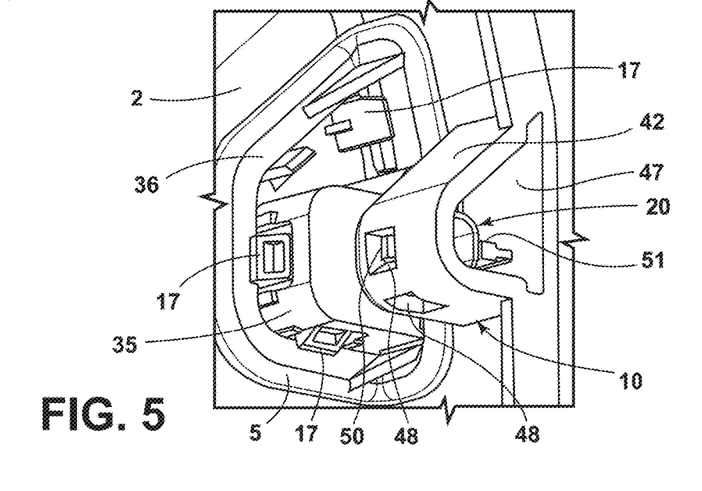
FIG. 5 is a fragmentary isometric view showing the striker assembled to the surround.

In a preferred embodiment, a pair of strikers 15 comprising mirror images of one another are mounted to the upright sidewalls 6 on opposite sides of central opening 4. Thus, the following description of strikers 15 and striker openings 5 generally applies to the left and right strikers 15 and striker openings 5 of FIG. 1. The striker 15 includes a flange 16 that is configured to engage the upright sidewall 6 of the surround structure 2 adjacent the striker opening 5 when the striker 15 is installed to the surround structure 2. The striker 15 includes one or more barbed connectors 17 (FIGS. 3-5) providing snap connecting features that engage the surround structure 2 adjacent the striker opening 5. The barbed connectors 17 may be configured to retain the striker 15 to the surround structure 2. The striker 15 further includes an interlocking projection 20 (FIG. 6) extending inwardly. The interlocking projection 20 is configured to engage the first interlock structure 10 (FIG. 7) such that the interlocking projection 20 substantially prevents rotation of the striker 15 due to outward forces "F" (FIGS. 2 and 8) caused by latch pawls 8 of a glove compartment door 12 acting on the striker 15.

The glove compartment door 12 includes one or more latch pawls 8 that are configured to releasably engage the strikers 15 to retain the glove compartment door 12 to retain the glove compartment door 12 in a closed position. The glove compartment door 12 may include a release 13 that shifts the latch pawls 8 inwardly in a known manner to thereby allow the glove compartment door 12 to move from the closed position (FIG. 2) to the open position of FIG. 1.

Figure 6:
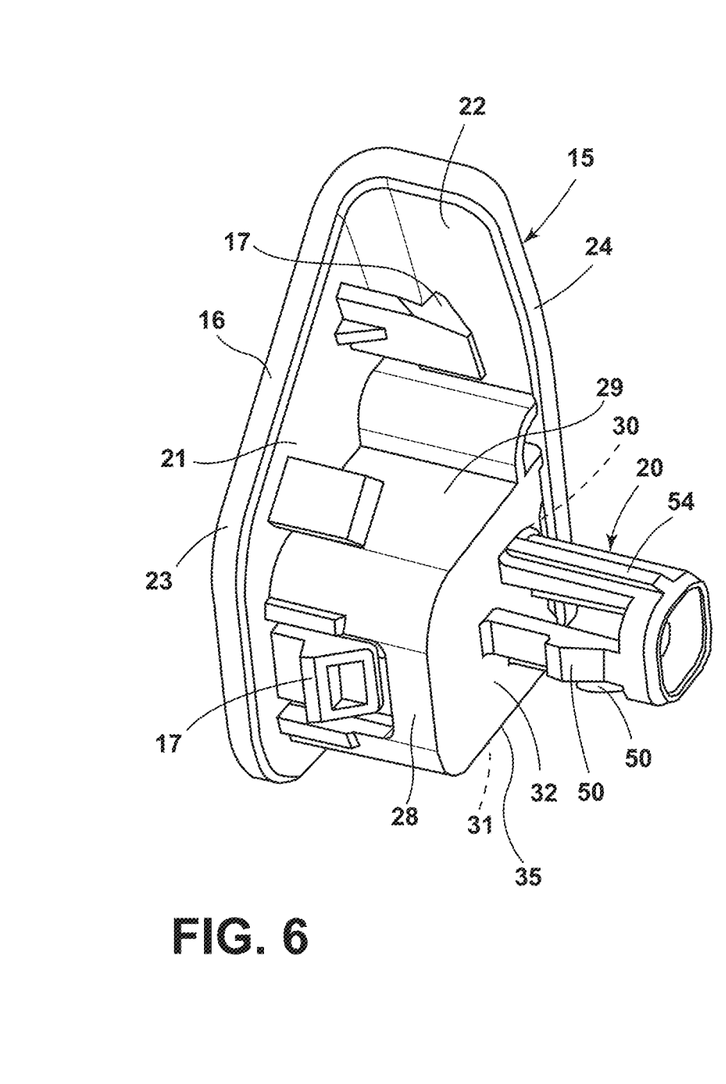
FIG. 6 is an isometric view of a striker.

With further reference to FIG. 6, striker 15 includes a first wall portion 21, and a second wall portion 22 that extends transverse relative to the first wall portion 21. The peripheral edges 23 and 24 of wall portions 21 and 22, respectively, are preferably sized to closely engage edge 25 of striker opening 5 of sidewall 6 of surround structure 2 (see also FIGS. 8-10). Striker 15 includes a cup-shaped portion 35 forming a cavity 27. The cavity 27 (FIG. 8) of striker 15 is formed by sidewall portions 28-31 and a base wall 32 of cup-shaped portion 35. As discussed in more detail below, a gap or groove 33 (FIG. 10) that is formed between the second wall 22 and sidewall 30 receives a flange 34 of surround structure 2 to thereby retain the striker 15 to the surround structure 2 despite forces F from latch pawl 8 (FIG. 8).

Figure 7:
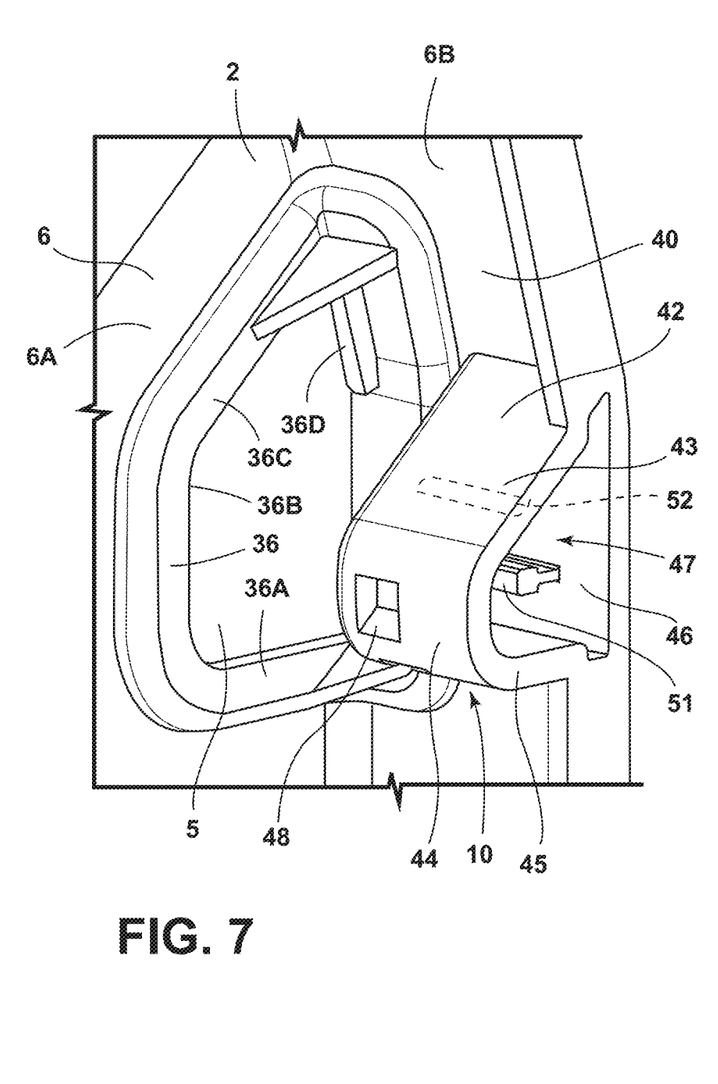
FIG. 7 is a partially fragmentary view of a portion of a surround that is configured to support the striker of FIG. 6.
Figure 8:
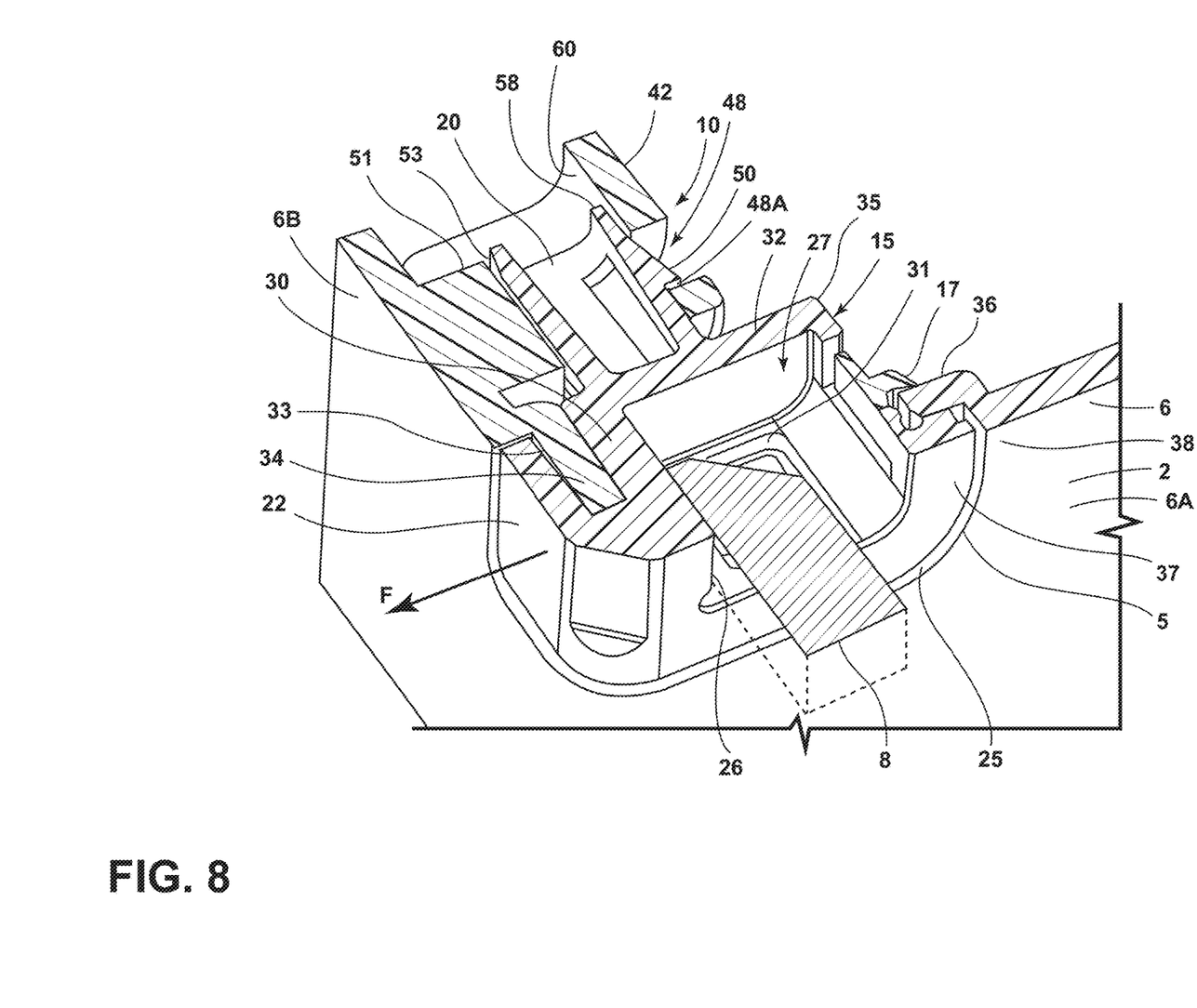
FIG. 8 is a partially schematic fragmentary cross-sectional view showing a striker installed to a surround, and a portion of a latch pawl engaging the striker.
Figure 9:
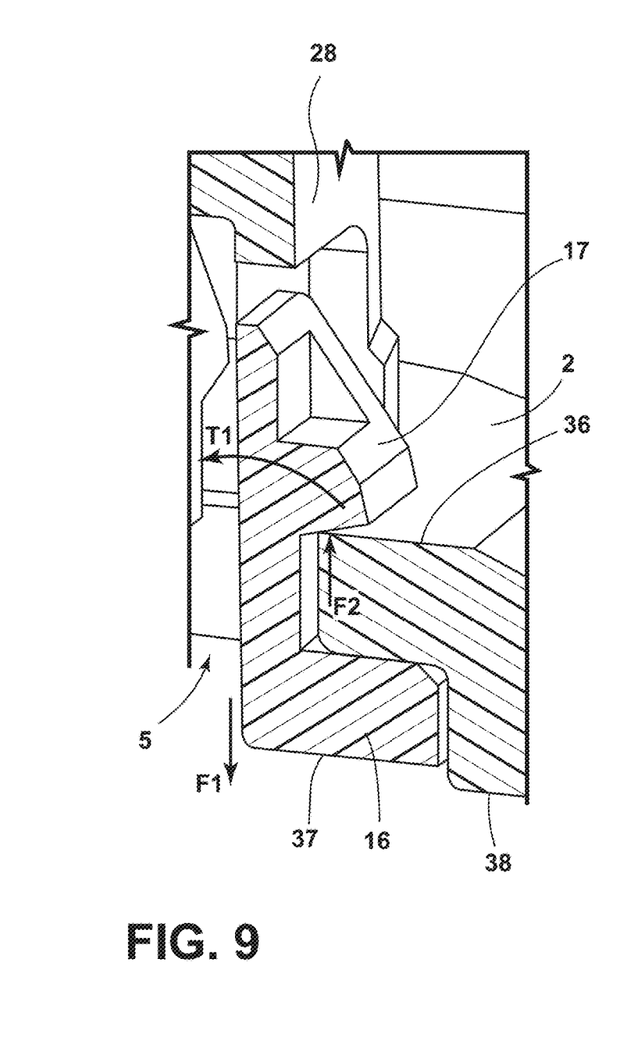
FIG. 9 is a fragmentary cross-sectional isometric view showing engagement of the striker with the surround.

With reference to FIGS. 7-10, surround structure 2 includes an offset lip or flange 36 with flange sections 36A-36D extending around striker opening 5. Flange 36 is offset relative to surface 38 of sidewall 6 of surround structure 2 whereby the edge or end surface 37 of striker 15 is substantially flush with surface 38 of surround structure 2 when the striker 15 is installed (FIG. 8). Sidewall 6 of surround structure 2 may include transverse wall portions 6A and 6B (FIGS. 7 and 8) corresponding to walls 21 and 22, respectively, of striker 15 whereby sidewall 6 is generally L-shaped in cross-section in the vicinity of striker opening 5. As shown in FIG. 7, the first interlock structure 10 of surround structure 2 may comprise a web or wall 42 that is integrally formed with a wall portion 40 of surround structure 2. The web or wall 42 may include an angled portion 43, an end portion 44, and a transverse portion 45. The web 42 and a web portion 46 of surround structure 2 form a passageway or opening 47 that is configured to receive the interlocking projection 20 of striker 15 when the striker 15 is assembled to the surround structure 2. One or more windows or openings 48 are formed in web 42. The openings 48 are configured to receive one-way tapered snap connectors 50 of interlocking projection 20 (FIG. 6). Openings 48 form retaining surfaces that engage connectors 50 to prevent removal of striker 15 from surround structure 2. The surround structure 2 also includes first and second guides or location features 51 and 52 that are configured to slidably engage corresponding guide surfaces 53 and 54, respectively, of interlocking projection 20 of striker 15 when the interlocking projection 20 is received in the opening 47 during assembly (see also FIG. 11). As shown in FIG. 11, the surround structure 2 includes a wall or web 56 that extends transverse relative to the web 42. The web portions 43-45 are integrally formed with a transverse web 56, and an opening 57 is formed in web 56 to thereby receive interlocking projection 20 of striker 15.

The surround structure 2 and striker 15 may comprise one-piece molded polymer or other suitable material. However, surround structure 2 and striker 15 may also comprise multi-piece assemblies formed from other materials in any combination.

Figure 14:
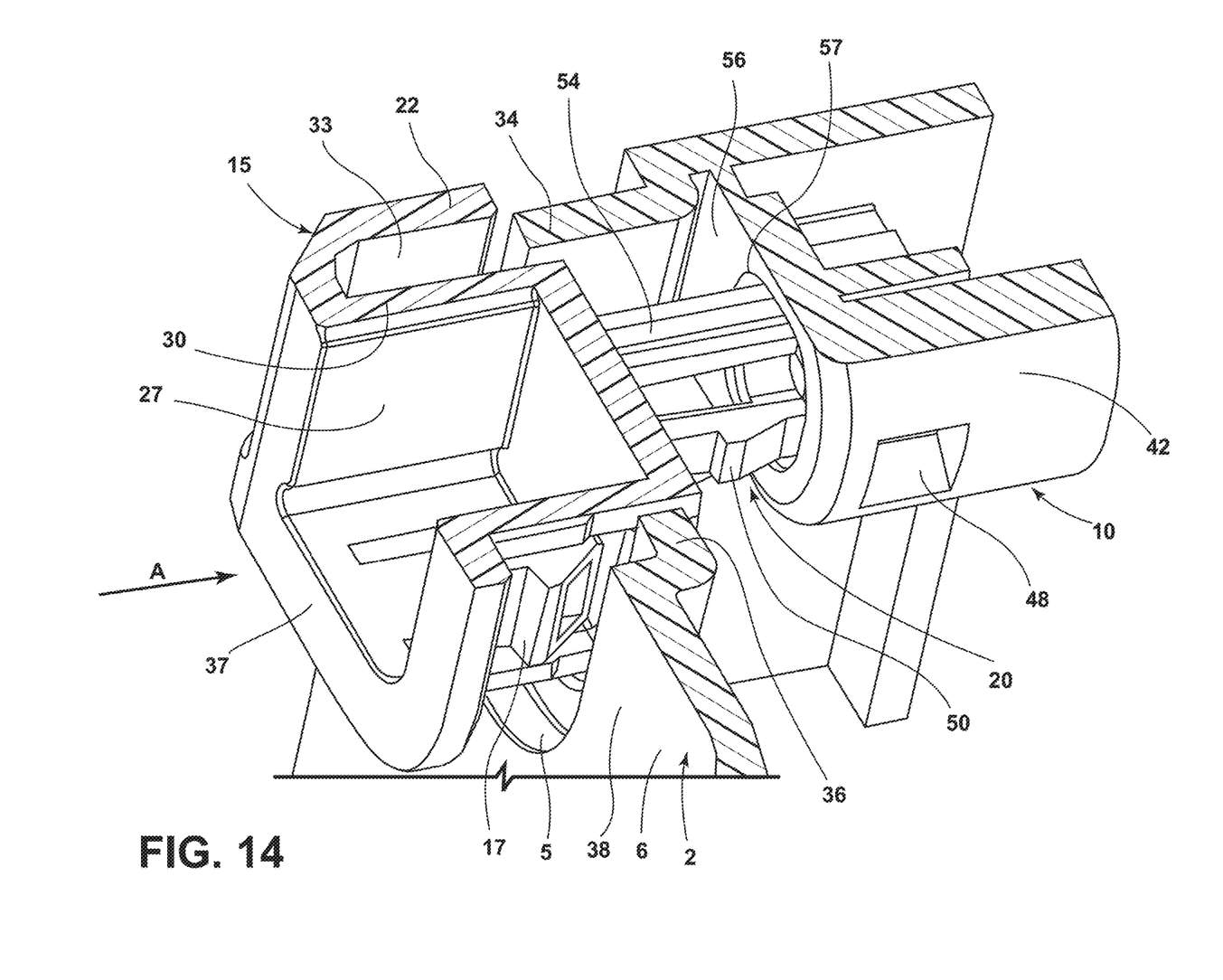
FIG. 14 is a partially fragmentary cross-sectional isometric view showing engagement of the striker with the surround during assembly.

With reference to FIG. 14, during assembly, the striker 15 is aligned with the striker opening 5 of surround structure 2, and the interlocking projection 20 of striker 15 is inserted into opening 57 of surround structure 2. The striker 15 is then moved (e.g. pushed) in the direction of the arrow "A", thereby causing the flange 34 of surround structure 2 to enter the groove 33 of striker 15. As striker 15 is shifted in the direction of arrow A, the interlocking projection 20 slidably engages the first interlock structure 10 of the surround structure 2. When the striker 15 is moved to the fully engaged position, the barbed connectors 17 of striker 15 engage flange 36 of surround structure 2 (e.g. FIG. 8), and the connectors 50 of interlocking projection 20 engage the windows or openings 48 of surround structure 2. The guide or support structures 51 and 52 of the surround structure 2 (FIG. 11) slidably engage the corresponding guide surfaces or features 53 and 54 of interlocking projection 20 to both guide and locate the striker 15 relative to the surround structure 2. When assembled, the connectors 17 and 50 prevent movement of striker 15 in a direction opposite the arrow A (FIG. 14) to thereby ensure that the striker 15 remains in the installed position on the surround structure 2.

Referring again to FIGS. 9 and 10, if a force "F1" is applied to striker 15 from surround structure 2, a force "F2" acts on the connector 17, and the connector 17 tends to rotate out of engagement with flange 36 due to torque "T1." This is due, at least in part, to the configuration of the connectors 17 which are in the form of cantilevered barbed prongs (FIG. 6).

Figure 10:
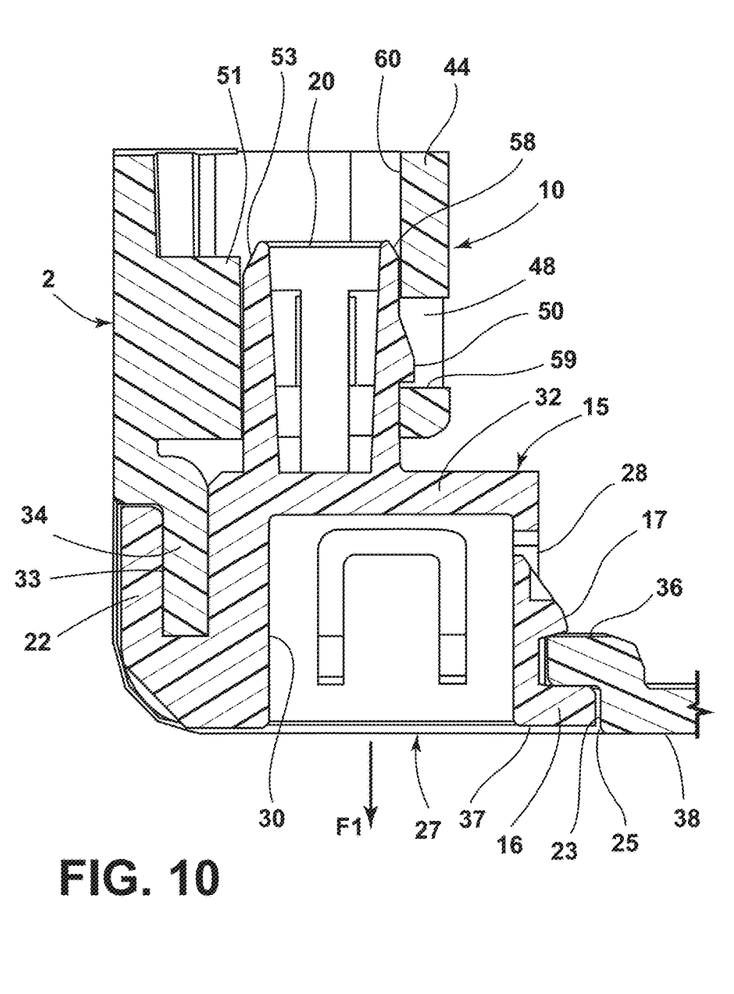
FIG. 10 is a fragmentary cross-sectional isometric view showing engagement of the striker with the surround.
Figure 11:
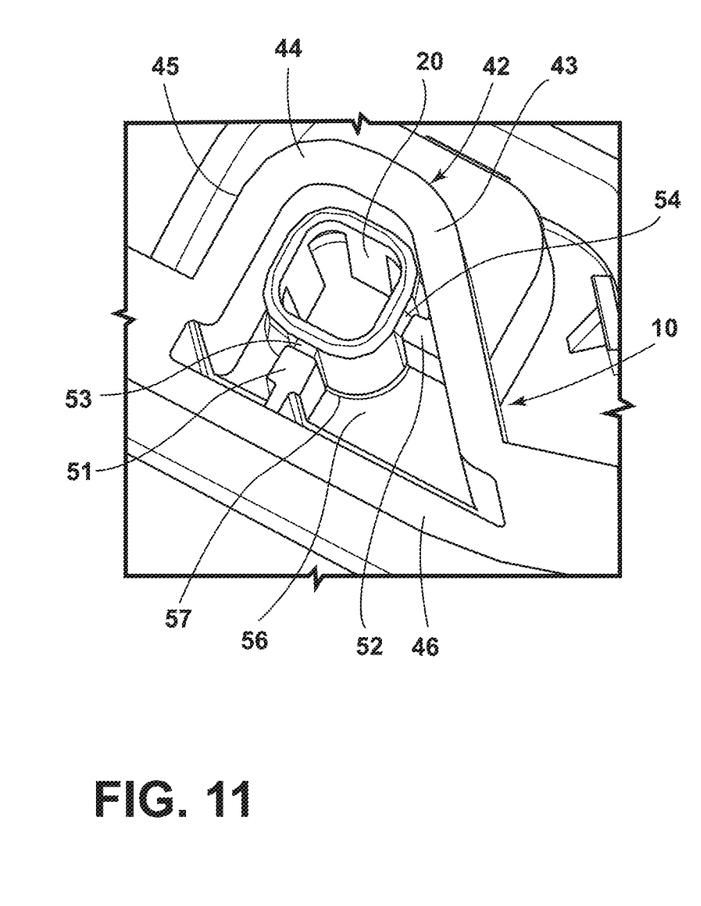
FIG. 11 is a fragmentary isometric view showing a portion of the striker engaging the surround.
Figure 12:
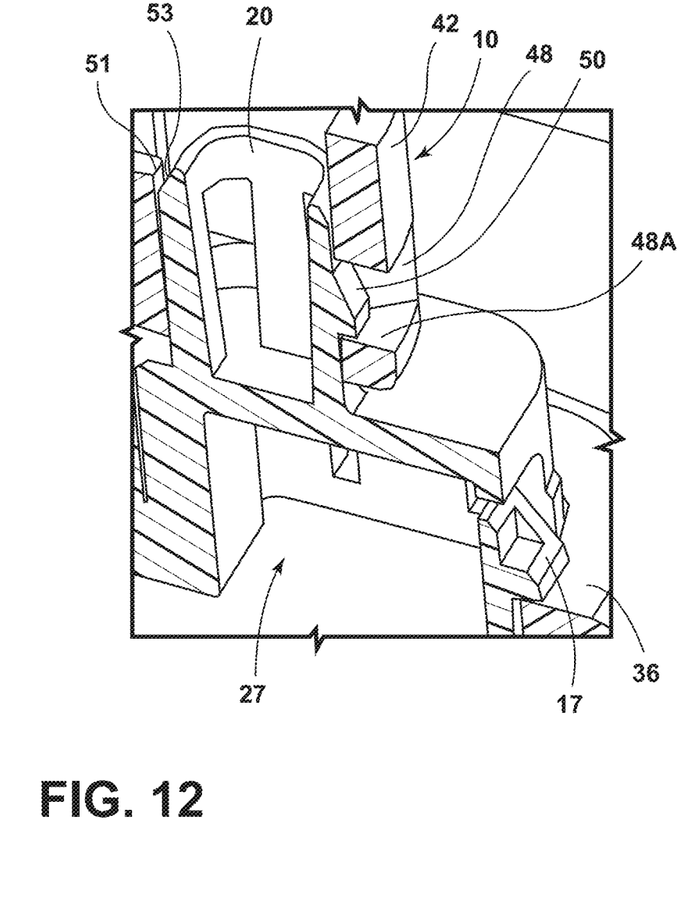
FIG. 12 is a fragmentary cross-sectional isometric view showing engagement of the striker with the surround.
Figure 13:
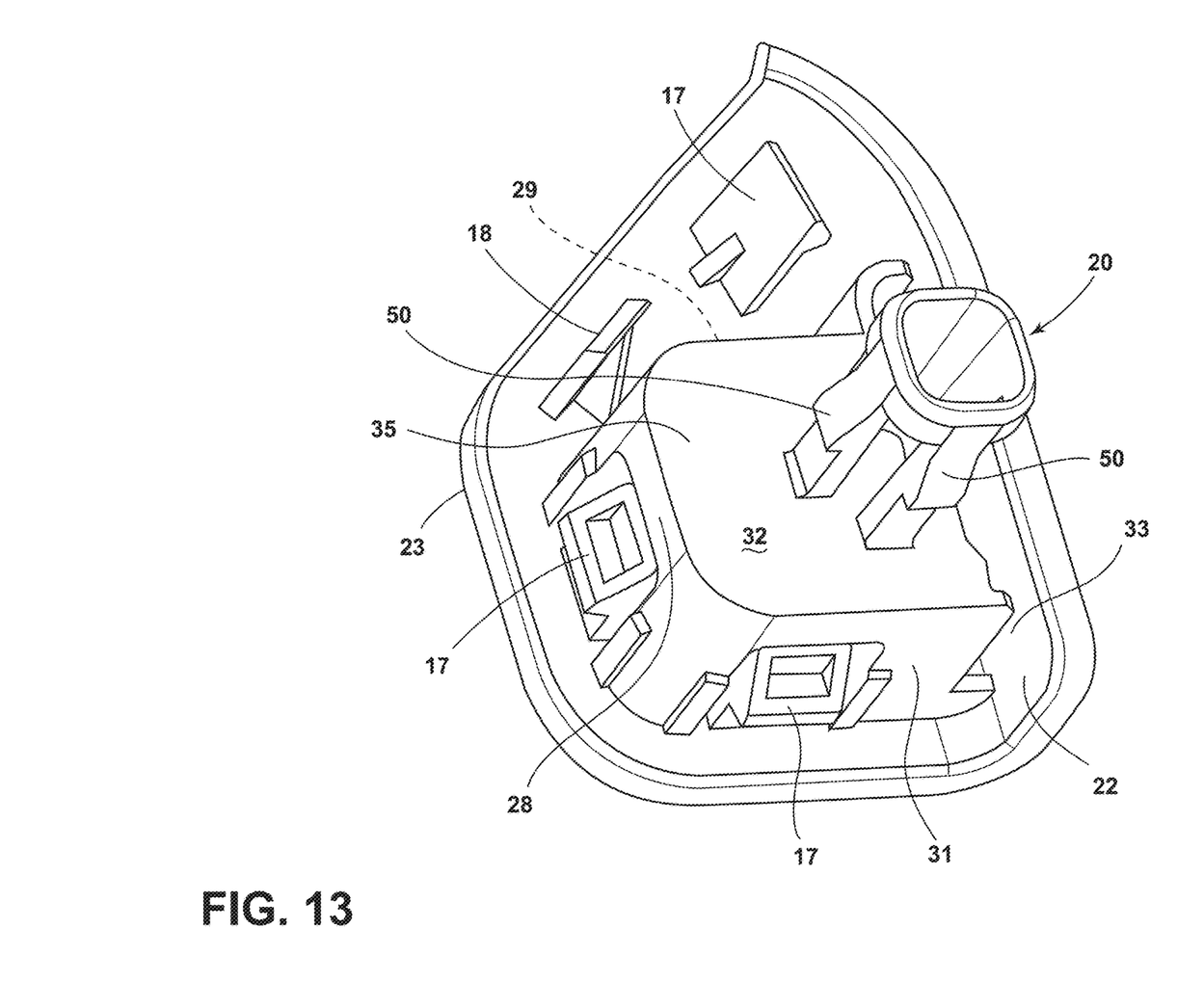
FIG. 13 is an isometric view of the striker.

However, with reference to FIG. 10, the same force F1 does not cause connector 50 to disengage from the edge 59 of opening 48. Specifically, the engagement of surface 53 of interlocking projection 20 with surface 51 of surround structure 2 prevents movement of tip portion 58 of interlocking projection 20 away from web portion 44. Similarly, engagement of surfaces 52 and 54 (FIG. 11) prevent dislodgement of the opposite connector 50 from opening 48.

Referring again to FIG. 8, the striker 15 remains securely engaged with the surround structure 2 if a force F is applied on the striker 15 by latch pawl 8 (e.g. if a force tending to open glove compartment door 12 is applied). Specifically, because flange 34 of sidewall 6B of surround structure 2 is received in groove 33 of striker 15, the force F is transferred into the sidewall 6B of surround structure 2 via flange 34. Also, the engagement of tip portion 58 of interlocking projection 20 with inner surface 60 of web 42 prevents rotation of striker 15, thereby preventing dislodgement of striker 15 from surround structure 2.

The striker 15 and interlocking structure 10 of the surround structure 2 facilitate assembly of striker 15 with the surround structure 2. Although striker 15 could, optionally, be secured to the surround structure 2 utilizing conventional mechanical fasteners or the like, the unique interlock design of the present application permits secure assembly without requiring conventional fasteners, such that mechanical fasteners are optional.

It is to be understood that variations and modifications can be made on the aforementioned devices and structures without departing from the concepts of the present invention, and further it is to be understood that such concepts are intended to be covered by the following claims unless these claims by their language expressly state otherwise.

What is claimed is:

1. A glove box assembly comprising:
a surround structure having a central opening and a striker opening in an upright sidewall of the surround structure, the sidewall having an outer side, at least a portion of which faces the central opening and an inner side, at least a portion of which faces away from the central opening, the surround structure further including a first interlock structure that is spaced inwardly from the inner side of the sidewall adjacent the striker opening and aligned with the striker opening;
a striker mounted in the striker opening of the surround structure adjacent the central opening, the striker including a flange engaging the upright side wall adjacent the striker opening;
a glove compartment door movably disposed in the central opening and including at least one latch pawl that is configured to releasably engage the striker to retain the glove compartment door in a closed position;
and wherein the striker includes an interlocking projection engaging the first interlock structure such that an interlocking extension substantially prevents rotation of the striker due to outward forces caused by the latch pawl acting on the striker.

2. The glove box assembly of claim 1, wherein:
the first interlock structure comprises an interlock opening.

3. The glove box assembly of claim 2, wherein:
the interlocking projection is received in the interlock opening.

4. The glove box assembly of claim 3, wherein:
the interlock opening is formed by a web extending around the interlock opening, the web having a retaining surface facing away from the central opening;
the interlocking projection includes a barbed connector engaging the retaining surface.

5. The glove box assembly of claim 4, wherein:
the web includes first and second retaining surfaces, the interlocking projection includes first and second barbed connectors engaging the first and second retaining surfaces, respectively.

6. The glove box assembly of claim 4, wherein:
the first and second retaining surfaces, comprise edges of first and second openings through the web.

7. The glove box assembly of claim 1, wherein:
the striker includes at least one barbed connector engaging the surround adjacent the striker opening to retain the striker to the surround.

8. The glove box assembly of claim 1, wherein:
the upright sidewall of the surround includes first and second wall portions that are transverse relative to one another.

9. The glove box assembly of claim 8, wherein:
the striker includes a groove;
the second wall portion includes a flange that is received in the groove.

10. The glove box assembly of claim 9, wherein:
the striker includes a cup-shaped portion forming a cavity that receives the latch pawl;
the striker includes an outer flange that is spaced apart from a sidewall at the cup-shaped portion to form the groove.

11. The glove box assembly of claim 10, wherein:
the cup-shaped portion includes first and second sidewalls and barbed connectors on the first and second sidewalls, the barbed connectors engaging the inner side of the sidewall of the surround adjacent the striker opening.

12. The glove box assembly of claim 11, wherein:
the cup-shaped portion comprises sidewalls extending around the cavity, and a base wall that extends transverse to the sidewalls, and wherein the interlocking projection extends from the base wall.

13. The glove box assembly of claim 1, wherein:
at least one of the striker and the surround comprises molded polymer.

14. A glove box assembly comprising:
a surround structure having a central opening and a striker opening in a sidewall of the surround structure, the surround structure further including an interlock opening that is spaced inwardly from the striker opening and aligned with the striker opening;
a striker mounted in the striker opening of the surround structure adjacent the central opening;
a glove compartment door movably disposed in the central opening and including at least one latch pawl that is configured to releasably engage the striker to retain the glove compartment door in a closed position;
and wherein the striker includes an interlocking projection received in the interlock opening.

15. A glove box assembly of claim 14, wherein:
a striker includes a flange engaging the upright sidewall adjacent the striker opening, and at least one barbed connector engaging the surround adjacent the striker opening to retain the striker to the surround.

16. The glove box assembly of claim 14, wherein:
the interlock opening is formed by a web extending around the interlock opening, the web having an opening forming a retaining surface;
the interlocking projection includes a barbed connector engaged the retaining surface.

17. The glove box assembly of claim 16, wherein:

the web includes an inner surface opposite the opening and facing the opening, and wherein the interlocking projection engages the inner surface to prevent disengagement of the barbed connector from the retaining surface.

18. A method of assembling a striker to a surround of a glove box assembly, the method comprising:

providing a surround having a central opening and a striker opening in a sidewall of the surround structure, the surround structure further including an interlock structure that is spaced inwardly from the striker opening;

providing a striker having a pawl-engaging portion and an interlocking projection;

positioning at least a portion of the striker in the striker opening; and causing the interlocking projection of the striker to engage the interlock structure by shifting the striker into an engaged position.

19. The method of claim 18, wherein:

a first interlock structure comprises an interlock opening; and including:

inserting the interlocking projection into the interlock opening.

20. The method of claim 19, wherein:

the interlock opening is formed by a web having a transverse retaining surface;

the interlocking projection includes a barbed connector;

causing the barbed connector to engage the transverse retaining surface.

\* \* \* \* \*